United States Patent [19]

Rao

[11] Patent Number: 5,121,398
[45] Date of Patent: Jun. 9, 1992

[54] BROADLY TUNABLE, HIGH REPETITION RATE SOLID STATE LASERS AND USES THEREOF

[75] Inventor: Rama Rao, Coram, N.Y.

[73] Assignee: Excel Technology, Inc., Holbrook, N.Y.

[21] Appl. No.: 557,443

[22] Filed: Jul. 23, 1990

Related U.S. Application Data

[63] Continuation-in-part of Ser. No. 412,743, Sep. 26, 1989.

[51] Int. Cl.⁵ .............................................. H01S 3/10
[52] U.S. Cl. ...................................... 372/20; 372/18; 372/69; 372/71; 372/98; 372/102; 372/105
[58] Field of Search ................. 372/98, 102, 105, 40, 372/41, 69, 70, 71, 20, 10, 18

[56] References Cited

U.S. PATENT DOCUMENTS

| | | | |
|---|---|---|---|
| 4,229,710 | 10/1980 | Shoshan | 372/102 |
| 4,559,500 | 12/1985 | McDermid et al. | 372/20 X |
| 4,761,786 | 8/1988 | Baer | 372/10 |
| 4,847,850 | 7/1989 | Kafka et al. | 372/71 |
| 4,873,692 | 10/1989 | Johnson et al. | 372/20 |
| 4,894,831 | 1/1990 | Alfrey | 372/19 |
| 4,901,322 | 2/1990 | Kangus | 372/20 |
| 4,932,031 | 6/1990 | Alfano et al. | 372/41 |

Primary Examiner—Georgia Y. Epps
Attorney, Agent, or Firm—Pennie & Edmonds

[57] ABSTRACT

Solid state and dye lasers are described which are tunable over a wide spectral region, are operable at high repetition rate, are uniformly narrow in spectral width over the tuning range, and produce a spatially uniform, single longitudinal mode beam. In one embodiment having a simple grazing-incidence cavity, the laser comprises: (a) a longitudinal pump beam with a KiloHertz (KHz) repetition rate; (b) a resonating cavity comprising a first fixed mirror, a diffraction grating, and a second rotatable mirror; and (c) an active solid state or dye medium within the cavity. In this embodiment, (i) the pump beam is passed through the fixed mirror and directed at the active medium; (ii) the emission from the active medium strikes the grating near a grazing angle; (iii) the rotatable mirror is placed at a first order diffraction position from the grating and reflects the desired wavelength radiation back into the cavity; and (iv) the output is derived from the grating at the zeroeth diffraction order. In a preferred embodiment the active medium is a titanium:sapphire crystal and the pump beam is generated by a Nd:YLF laser. One application of the preferred embodiment is for laser isotope separation, for example, for separation of Uranium-235 from gaseous Uranium.

37 Claims, 10 Drawing Sheets

BROADLY TUNABLE, HIGH REPETITION RATE SOLID STATE LASERS AND USES THEREOF

This invention was made with Government support under contract Nos. 8700034 and N00014-88-C-0716 awarded by the National Science Foundation and Strategic Defense Initiative Organization, respectively. The Government has certain rights in this invention.

CROSS-REFERENCE TO RELATED APPLICATION

This is a continuation-in-part of application Ser. No. 07/412,743 filed Sep. 26, 1989, which is incorporated herein by reference.

BACKGROUND OF THE INVENTION

Tunable lasers have been known for some time. FIG. 1 illustrates a simple tunable laser configuration 10. It comprises a tunable solid state active medium or a dye solution 12 which is excited by a suitable laser 14 emitting an excitation laser beam $\lambda_L$. A resonator is formed by a pair of mirrors 16, 18, of which mirror 16 has a high reflectance while mirror 18 is partially transmitting. A stimulated laser beam $\lambda_{tunable}$ is output through partially transmitting mirror 18. In this illustration excitation beam $\lambda_L$ and tunable laser beam $\lambda_{tunable}$ are at right angles, a configuration known in the art as transverse pumping.

In the transverse pumping arrangement, the population inversion in the active medium is non-uniform along the path of the excitation laser beam since the beam is attenuated in the active medium. This gives rise to large diffraction loss and large beam divergence.

A better configuration for laser pumped tunable lasers is the longitudinal pumping arrangement 20 of FIG. 2. Again, this arrangement comprises an active medium 22, an excitation laser 24, and two spaced mirrors 26, 28 that define a resonator cavity. However, in this arrangement an excitation beam $\lambda_L$ passes through one of the resonator cavity mirrors 26 of the tunable laser cavity. While entry mirror 26 transmits the excitation radiation, it almost totally reflects the tunable laser emission. The second mirror 28 is a partially transmitting mirror that serves as an "exit" or output mirror that permits emergence of a tunable laser output $\lambda_{tunable}$. This configuration leads to greater spatial uniformity of the tunable laser beam.

The output of the lasers described in FIGS. 1 and 2 above has a rather broad bandwidth because tunable solid state crystals or dyes generally have wide fluorescence spectra. The broadband fluorescence can be used advantageously to tune a laser, i.e., to readily obtain highly monochromatic laser emission of any given frequency within the fluorescence spectrum. Fine tuning of the laser wavelength and simultaneous attainment of narrow linewidth can be achieved by using wavelength-selective elements in the resonator cavity.

One method which is commonly used for achieving a small spectral linewidth employs one or more birefringent filters and/or etalons in the resonator cavity. One drawback of this method is that alignment becomes very complicated because of multiple elements in the cavity. Furthermore, each element introduced into the cavity produces loss of the output power.

Another method makes use of devices for spatial wavelength separation. FIG. 3 illustrates a resonator 30 comprising an active medium 32, a mirror 36 and a rotatable grating 38. The grating is set at the Littrow mount position and autoreflects radiation of the desired wavelength back to the active medium. This class of resonator is also not free of problems. First, the grating may be damaged by a high power incident beam. Second, in this configuration only a small area of the grating can be illuminated resulting in a poor spectral resolution. Both of these problems are solved in resonator 40 of FIG. 4 by the use of beam expanding optics 39 with the same components as in resonator 30. However, the introduction of beam-expanding optics often causes undesirable reflection losses, complicates optical alignment, and increases the sensitivity to thermal damage.

Furthermore, most of the above mentioned lasers operates at a relatively low repetition rate of about 10 Hz limiting the capability of data acquisition and reducing the signal to noise ratio. Moreover, bulkiness of the laser configuration gives rise to long cavity lengths L. As a result, the free spectral range C/2L (C is the velocity of light) which is the reciprocal of the time it takes a light beam to make a round trip between the cavity mirrors is correspondingly small; and undesirable mode hopping can result.

Thus there is a need for a spectrally narrow linewidth tunable laser having a high output repetition rate that does not compromise other properties.

SUMMARY OF INVENTION

In accordance with the invention, solid state lasers have been devised which are tunable over a wide spectral region, are operable at high repetition rate, are uniformly narrow in spectral width over the tuning range, and produce a spatially uniform, single longitudinal mode beam.

In one embodiment, the laser comprises:
(a) a longitudinal pump beam with a KiloHertz (KHz) repetition rate;
(b) a resonating cavity; and
(c) an active solid state medium within the cavity.

The pump beam advantageously is generated by a Neodymium:Yttrium Lanthanum Fluoride laser; and the active solid state medium is Titanium:sapphire.

The laser of the present invention has numerous applications because of its advantageous operating parameters. High resolution spectroscopic studies can be performed with this laser because its spectral linewidth is comparable to the atomic and molecular transitions. The high repetition rate of the KHz lasers provides 100 times faster excitation and data acquisition rate than conventional 10 Hz laser systems. This permits sophisticated signal averaging needed to improve the signal to noise ratio. The high repetition rate also provides high average power which compares favorably with that available from cw dye lasers. Furthermore, high peak power with the pulsed nature of the laser allows efficient use of the system for nonlinear optical processes. For example, frequency up-conversion of a tunable Ti:sapphire laser can provide tunable radiation across the entire spectrum from ultraviolet to infrared.

The combination of relatively high output power and frequency selectivity makes the present invention especially advantageous in the photodynamic treatment of cancer. In such treatment precise control of the frequency of the treating laser beam is needed to treat a localized malignant tumor with minimal effect on surrounding healthy tissue.

In remote sensing applications, a kilohertz repetition rate can provide enhanced capability of discrimination among different constituents of the atmosphere by increasing the signal to noise ratio.

In the context of ballistic missile defense, the lethality of a laser beam can be increased by hitting the target with a sequence of pulses. Serial pulses with sub-nanosecond interpulse separation permit a large cumulative impulse delivery. Thus mechanical damage to the target can be maximized by delivering a series of short pulses instead of a single long pulse.

Still another application of the present invention is in the field of laser isotope separation and, in particular, the separation of Uranium-235 from Uranium-238. Isotope separation requires efficient, tunable, narrow line and high average power lasers. Prior art developments have included the use of a copper vapor laser to pump a tunable dye laser which is used to selectively ionize Uranium-235. The ionized Uranium-235 can then be separated from Uranium-238 by means of a magnetic or electric field. See, for example, A.A. Pease and W.M. Pearson, "Axial Mode Structure of a Copper Vapor Pumped Dye Laser", *Applied Optics*, (Vol. 16, No. 1, January 1977) and J.I. Davis, J.Z. Holtz and M.L. Spaeth, "Status and Prospects for Lasers in Isotope Separation", *Laser Focus (USA)*, p. 49 (September 1982), both of which are incorporated herein by reference. Such prior art techniques are very inefficient since they typically require three photons to provide the six electron volts required to ionize a Uranium-235 atom.

In accordance with the invention, a Nd:YLF laser is advantageously used to produce a longitudinal pump beam which pumps a Titanium:sapphire laser at a pulse repetition rate of approximately one to three kiloHertz. The Nd:YLF laser has a pulse width of approximately 200 to 300 nanoseconds and a relatively large pulse energy on the order of 1.5 to 2 milliJoules. The output of the Ti:sapphire laser is frequency- doubled by a conventional doubler and the resulting beam is used to irradiate gaseous Uranium isotopes. With this arrangement, the frequency of the laser beam incident on the Uranium isotopes is sufficiently high that a single photon has an energy of more than six electron volts. As a result, ionization of the Uranium-235 isotopes is far more efficient.

BRIEF DESCRIPTION OF THE DRAWINGS

These and other objects, features, and advantages of the invention will be more clearly understood from the following detailed description of preferred embodiments of the invention in which.

DESCRIPTION OF THE PREFERRED EMBODIMENTS

1. Simple Grazing Incidence Cavity

Figure 1:
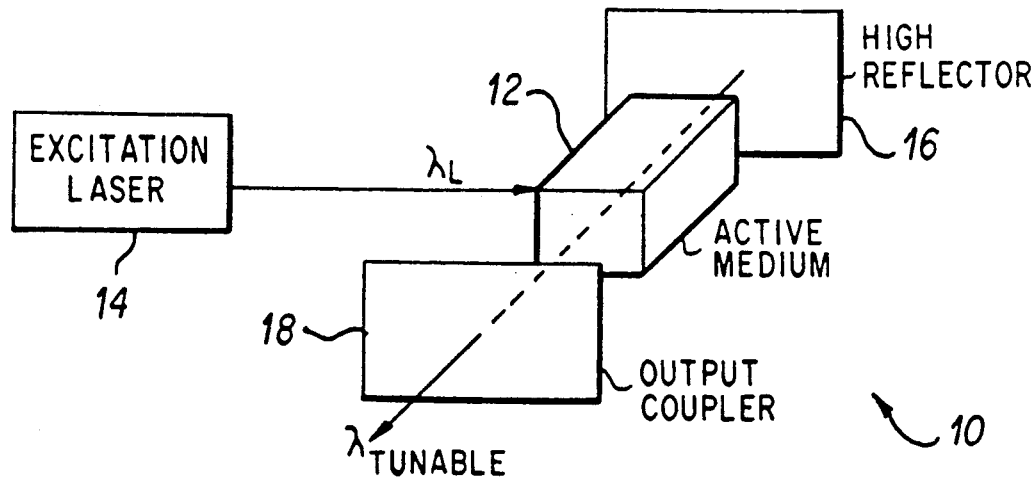
FIG. 1 illustrates a prior art transversely pumped tunable laser.
Figure 2:
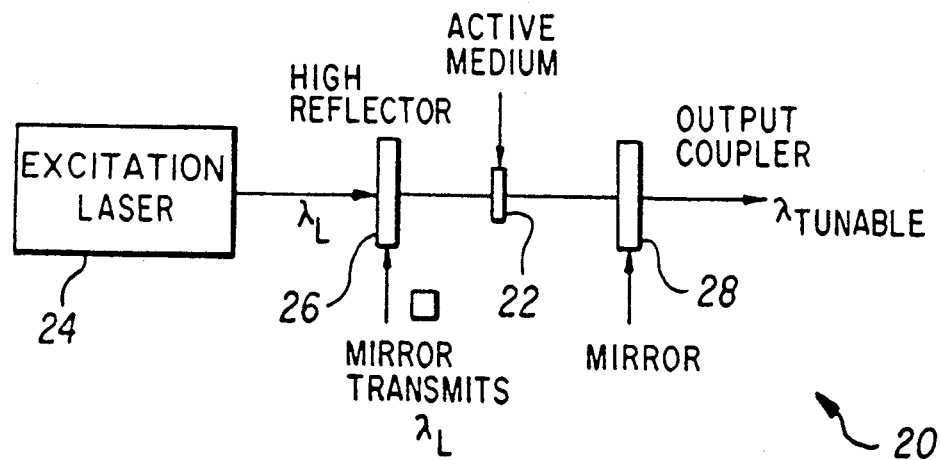
FIG. 2 illustrates a prior art longitudinally pumped tunable laser.
Figure 3:
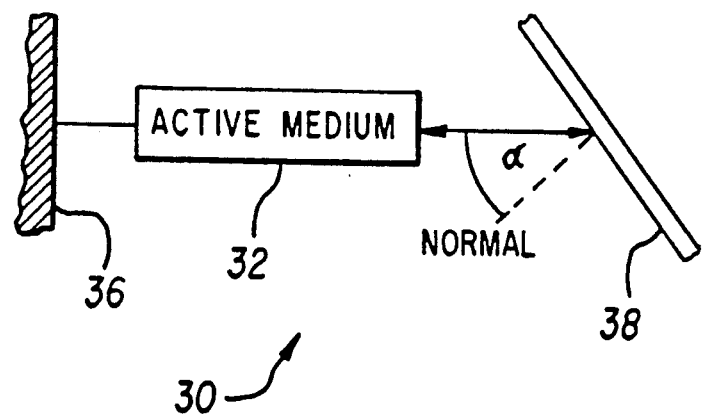
FIG. 3 illustrates a prior art wavelength-selective resonator which makes use of the dispersive property of the grating.
Figure 4:
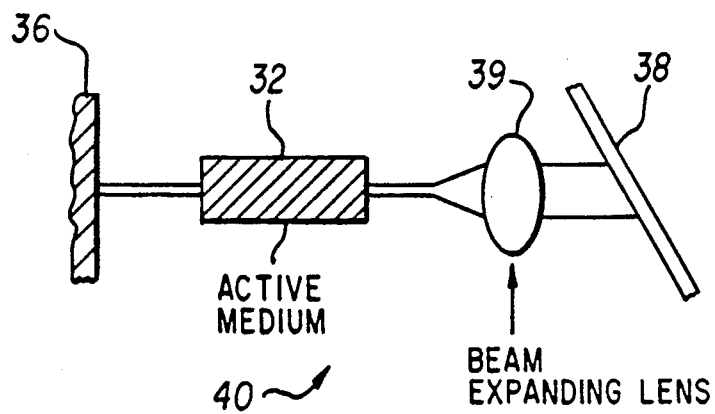
FIG. 4 illustrates a resonator similar to that of FIG. 3 except that beam expanding optics has been added to illuminate the larger width of the grating.
Figure 5:
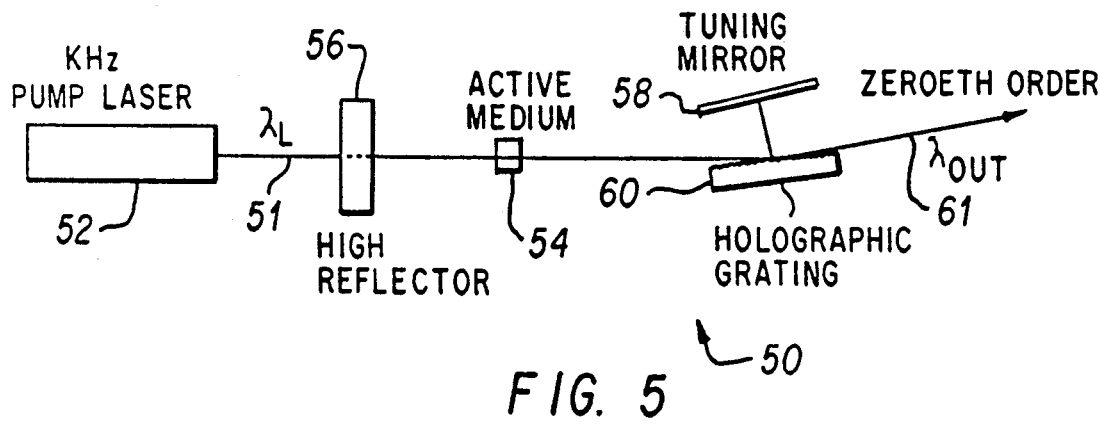
FIG. 5 illustrates a preferred embodiment of a simple grazing-incidence cavity design of a KHz repetition rate tunable laser (either solid state or dye) of the present invention.

FIG. 5 depicts a preferred embodiment of a high repetition rate tunable laser 50 of the present invention using a simple grazing incidence cavity. As shown therein, a pump beam 51 generated by a KHz repetition rate pump laser 52 is directed at an active medium 54 (solid state crystal or dye) in a longitudinal direction, i.e., collinear or nearly collinear (angle 5°) with the optic axis of a resonator cavity 55. The resonator cavity is formed by a broadband high reflectance mirror 56, which transmits the pump beam while serving as a total reflector to a tunable emission beam 61, and a high reflectance tuning mirror 58. A diffraction grating 60 which illustratively is a holographic grating is mounted in the cavity so that a beam collinear with the optic axis will strike it near grazing incidence. Tuning mirror 58 is placed so as to intercept the mth order of diffraction of the desired wavelength of the emission beam 61 and is oriented so as to reflect such mth order of diffraction back on itself. In a preferred embodiment this tuning mirror is placed at the first order of diffraction.

In this arrangement, a small fraction of the beam incident on the grating is diffracted, the larger part being reflected out as useful output in the zeroeth order reflection. Of the diffracted beam, only a small selected range of wavelengths is directly reflected back, i.e., retraces its path towards the grating. These wavelengths are diffracted once more by the grating and are directed back to the active medium for further amplification. As is well known, the orientation of tuning 58 mirror with respect to the grating determines the selected wavelengths.

Figure 10:
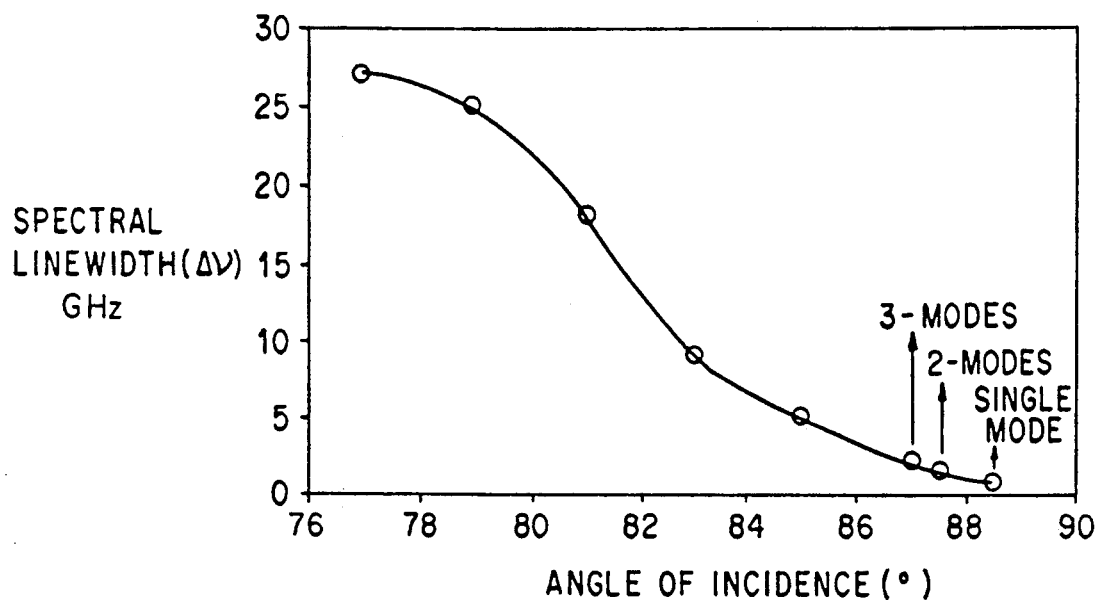
FIG. 10 shows the spectral linewidth versus angle of incidence at the grating for the simple grazing-incidence cavity design of a KHz repetition rate dye laser system.

It is important to note that the spectral resolution of the grating depends only on the illuminated length of the grating, not on the height, diffraction order, or groove spacing. Therefore, the closer the angle of incidence of the illuminating beam onto the grating approaches 90 degrees, the wider the beam and better the resolution. As a rule of thumb, spectral linewidth is given by operating wavelength divided by the number of grooves in the illuminated area of the grating. For a grating of 2400 lines/mm, if a 5 cm grating length is illuminated, the spectral linewidth is approximately 0.004 nm at 560 nm. This corresponds to a spectral linewidth less than 4 GHz. As shown in FIG. 10, the present invention has achieved spectral linewidth less than 750 MHz operating in a single longitudinal mode for an angle of incidence of 88.5 degree for a KHz repetition rate dye laser system.

Although the grating is generally fixed in position for normal operation, this is done only for the sake of minimizing the number of adjustments. Advantageously, the grating incidence angle may be adjusted to change the width of the illuminated area. This adjustment alters the spectral linewidth of the output beam. Thus variable spectral linewidth of the laser can be obtained by merely changing the angle of incidence at the grating.

For purpose of the present invention, the active medium can be any active medium suitable for lasing. Preferred active media include, but are not limited to dye solutions, e.g., Rhodamine 6G, 640, and solid state crystals e.g., Ti:Sapphire; Co:Magnesium Fluoride. Where dye solutions are used as the active medium, a transverse flow cell is advantageously used.

As described above, in the grazing incidence design, a major fraction of the beam leaves the resonator as useful output in the zeroeth order reflection from the grating. Therefore, zero order loss is avoided. However, this also means a small gain per oscillation. This main drawback can be remedied by decreasing the cavity length. Since the only optical component inside the cavity is the grating, the cavity length can be shortened significantly. In one embodiment of the present invention, the cavity length is maintained at less than 8 cm. As the round trip time in an 8 cm cavity is approximately 500 psec, there are at least 40 round trips during the excitation time ($\approx 100$ nsec) of the pump pulse. As a result, even a small feedback from the grating is sufficient to stimulate emission at the desired wavelength.

It follows directly that low gain active medium such as crystals can be successfully used in this laser system.

There are additional benefits from reduced cavity length. First, as noted above the free spectral range between adjacent longitudinal modes is given by C/2L, where C is the velocity of light and L the cavity length. When L=10 cm, the free spectral range is so large (C/2L=1.5 GHz) that mode hopping is virtually eliminated. Therefore, the cavity has a natural tendency to run in a single longitudinal mode. Second, amplified spontaneous emission (ASE) background is dramatically reduced. ASE is due to single pass amplification, whereas lasing is due to multiple pass amplification. The small gain per pass in the instant invention greatly reduces noise relative to signal, generally to less than 0.01%.

In a preferred embodiment, the length of the grating is about 5 cm and the cavity length is 8 cm.

In any laser system, there is always a compromise between obtainable spectral linewidth and efficiency of the system. As the angle of incidence at the grating is increased, the spectral resolution improves (linewidth decreases) but at the cost of diffraction efficiency of the grating and thus overall efficiency of the system drops. This is shown in FIG. 10. In the present invention of a KHz repetition rate dye laser, a conversion efficiency of 20% was obtained at an angle of incidence of 78° (measured with respect to a normal to the grating) while the efficiency dropped to 2% at 88.5° where single longitudinal mode operation was obtained.

2. Internally Self-Injected Grazing-Incidence Cavity

Figure 6:
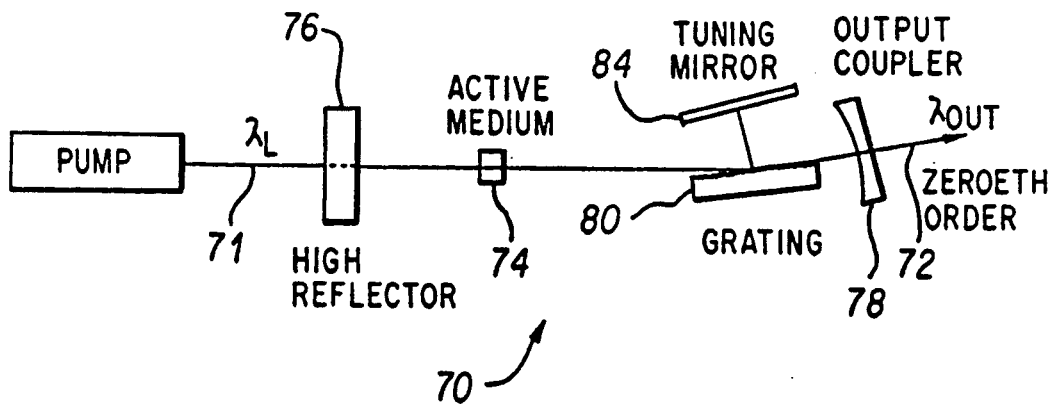
FIG. 6 illustrates a preferred embodiment of an internally self-injected grazing incidence cavity design of a tunable KHz repetition rate laser of the present invention.

To improve the efficiency of the previously described system while retaining the advantageously narrow spectral linewidth, a laser 70 was developed having an internally injected grazing-incidence cavity as shown in FIG. 6. In this design two cavities are formed; (1) a non-dispersive main cavity, and (2) a narrow-line auxiliary cavity. The main oscillator cavity is formed by a high reflectance mirror 76, an active medium 74 and an output coupler 78 placed at the zeroeth order from a grating 80. Again the active medium is pumped by a laser beam 71 emitted by pumping laser 72. As far as the main cavity is concerned, grating 80 simply acts like a tuning mirror. The auxiliary cavity is formed by placing a tuning mirror 84 so as to intercept the first order of diffraction from the grating. Useful output is obtained from the output coupler which passes a portion of the zeroeth order from the grating.

As is apparent this design adds an output coupler at the location of zeroeth order from the grating but in all other respects is the same as the embodiment of FIG. 5. In this configuration, the auxiliary cavity continuously injects a narrow line to control the stimulated emission process in the main cavity. Again due to the extremely short cavity length, there can be at least 40 round trips during the excitation time of the pump pulse (or during the time population inversion is maintained). In this way even a small feedback from the auxiliary cavity is sufficient to control the stimulated emission process in the main cavity. The only requirement on the injected radiation is that it has to exceed the noise (spontaneous emission) in its own spatial mode.

A simple analysis indicates that in a high gain amplifier, the noise is equivalent to an input power of:

$$P_0 = 8 \, h\nu \, \Delta\nu$$

in which $h\nu$ is the photon energy and $\Delta\nu$ is the linewidth. This is equivalent to a power level in the range of nanowatts for a visible photon of 1 GHz spectral linewidth. Even if we assume 2% efficiency of the grating at 88.5° ($\approx 1$ GHz linewidth), the injected signal will be in the range of 100 $\mu$W for an output of 10 mW from the main cavity. This input signal is four orders of magnitude more than the minimum injected signal needed to overcome spontaneous noise.

As mentioned previously, a linewidth of less than 750 MHz with conversion efficiency of 2% was obtained in the simple grazing incidence cavity design. In contrast, in the self-injected configuration an improvement in the output power by a factor of ten was observed representing a conversion efficiency of 20%.

3. Externally Self-Injected Grazing-Incidence Cavity

Figure 7:
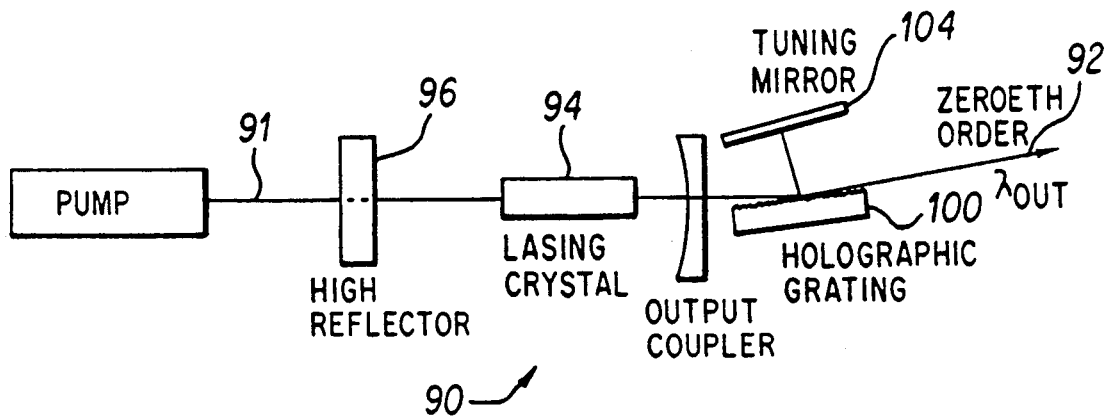
FIG. 7 illustrates a preferred embodiment of an externally self-injected grazing-incidence cavity design of a tunable KHz repetition rate solid state laser of the present invention.

In this embodiment, a laser 90 has an auxiliary cavity external to the main cavity as shown in FIG. 7. This embodiment is especially suited for solid state crystals (e.g., Ti:Sapphire; Co:Magnesium Fluoride) because of their lower gain compared to dye solutions. In this embodiment, the auxiliary cavity is used for injection seeding only.

The elements of laser 90 are the same as those of laser 70 and bear the same numbers increased by 20. In the case of laser 90, however, the auxiliary cavity is located on the outside of the output coupler rather than the inside.

If we assume 2% efficiency of the grating at 88.5° ($\approx 1$ GHz linewidth) and a 20% transmission by the output coupler, the injected signal through the output coupler will be in the range of 20 $\mu$W for an output of 10 mW from the main cavity. This input signal is almost three orders of magnitude more than the minimum desired injected signal to overcome the spontaneous noise.

Figure 8:
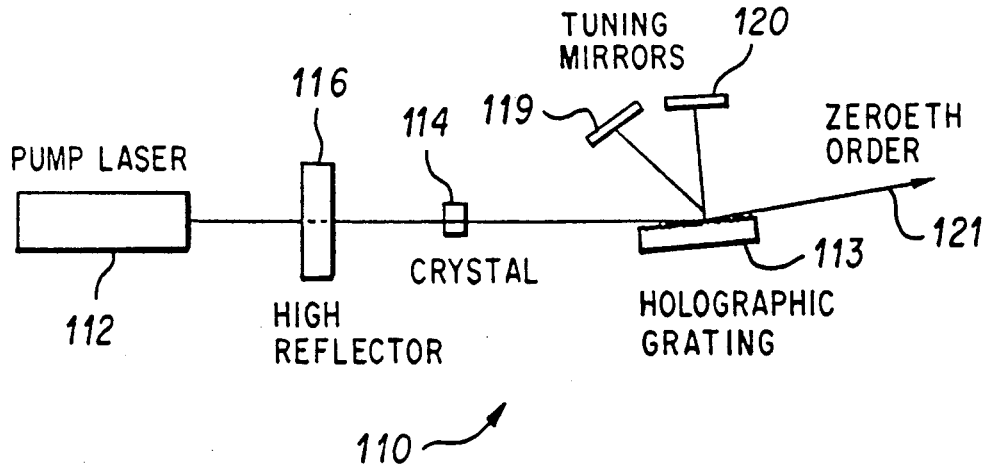
FIG. 8 illustrates a preferred embodiment of a simultaneous two frequency KHz repetition rate tunable laser of the present invention which can be used in the cavity designs shown in FIG. 5, 6 and 7.

The system can also be operated simultaneously in a two-frequency mode as for remote sensing applications, as in laser 110 shown in FIG. 8. The components of laser 110 are the same as those of FIG. 5 and bear the same numbers increased by 60. In this configuration a second tuning mirror 119 is positioned at the second order diffracted beam from the grating. This creates a second feedback channel, resulting in a double frequency narrow band lasing. As the output is derived through the zeroeth order from the grating, the two output frequencies can be independently tuned by the rotation of the mirrors M1 and M2 and the two output beams are exactly collinear.

4. A GigaHertz Repetition Rate Tunable Laser

The generation of ultrashort pulses by mode-locking is well known from gas and solid state lasers. However, in the present invention, because of the extremely short cavity of all three grazing-incidence cavity designs, even shorter pulses at very high repetition rate can be obtained. As the light circulates inside the resonator with a repetition rate determined by the round trip transit time, a train of equally spaced pulses with a C/2L repetition frequency of 1-3 GHz can be generated for a cavity length of less than 10 cm.

Figure 9:
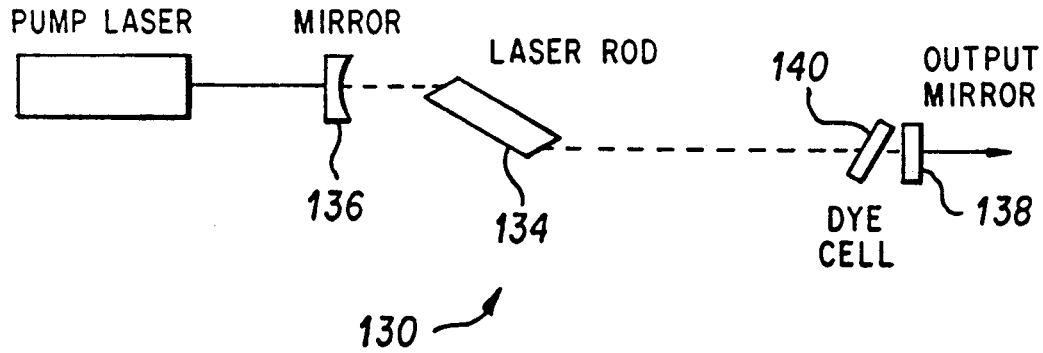
FIG. 9 illustrates a preferred embodiment of a GHz repetition rate tunable laser system of the present invention which can be used in the cavity designs shown in FIG. 5, 6 and 7.

In the present invention, short pulses at GigaHertz repetition rates were generated by passive mode-locking technique using a saturable absorber in the entire expected gain bandwidth of the active medium. As shown in FIG. 9, a laser 130 comprises a lasing medium 134, a high reflectance mirror 136 and an output mirror 138. A thin saturable dye-cell 140 which illustratively is 100 $\mu$ thick is placed just in front of the output mirror. Alternatively, the dye cell can be placed near the high reflectance mirror.

This type of GHz pulse generation can be successfully adopted in all three previously mentioned cavity designs; (i) simple grazing-incidence cavity, (ii) internally self-injected grazing-incidence cavity design, and (iii) externally self-injected grazing-incidence cavity design.

Examples of the practice of the invention are as follows.

EXAMPLE 1

In this example, an extremely stable, spectrally narrow ($\approx 500$ MHz) and single longitudinal mode tunable dye laser oscillator is described capable of operating at KHz repetition rate. An internally self-injected grazing-incidence cavity design has yielded an energy conversion efficiency of approximately 20%.

An extremely short cavity (5 cm), longitudinally pumped, grazing-incidence design dye oscillator cavity was constructed as shown in FIG. 5. In order to extend the repetition rate while maintaining the spectral and spatial quality of the beam, a fast flow cell was designed to minimize non-stationary waves caused by the turbulence as well as pressure variation of the dye medium which are the major causes of frequency jitter and intensity fluctuation. The pump laser used was a cw, Q-switched, frequency-doubled Nd:YAG laser operating at 532 nm with maximum pump energy of approximately 180 $\mu$J, pulse duration of approximately 60 nsec, and with variable repetition rate of 1-3 KHz. In the grazing-incidence design, since there are no optical components except the diffraction grating inside the cavity, the length of the cavity is shortened to less than 5 cm. As described before, the short cavity design has a direct effect on the frequency stability, single mode operation and amplified spontaneous emission background in the dye laser output.

The observed spectral linewidth versus angle of incidence is plotted in FIG. 10. For angles of incidence 87°, 87.5°, and 88.5°, the system was observed to be oscillating in three modes, two modes and one mode, respectively. For any angle greater than this, due to the limitation in the available pump power, it became difficult to maintain stable laser operation. For single mode operation at 88.5°, with the Fabry-Perot set at 3 GHz FSR, the spectral linewidth of the laser is estimated to be approximately 500 MHz.

Figure 11:
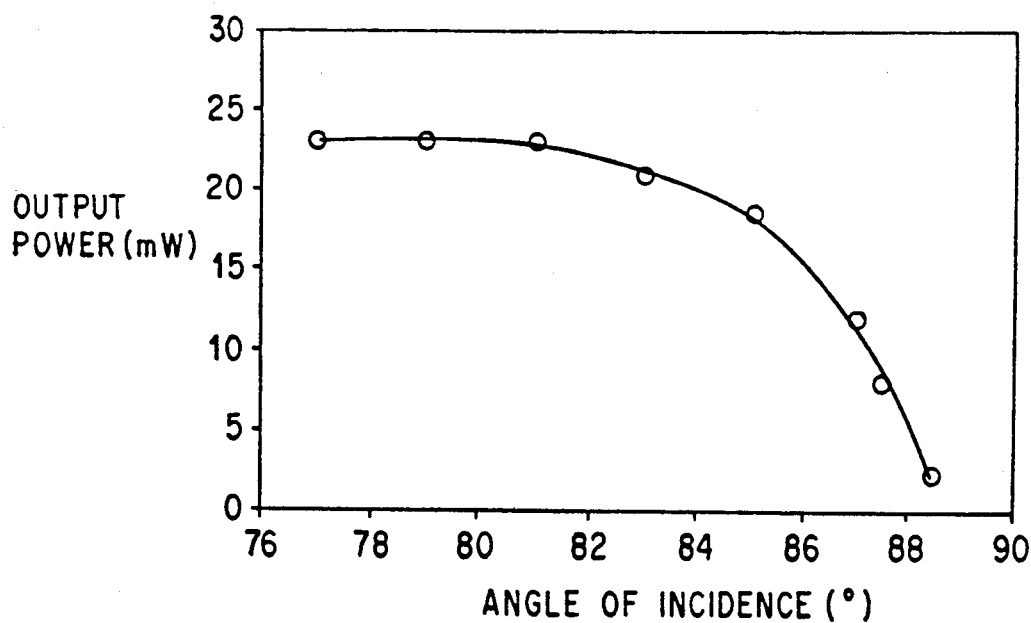
FIG. 11 is a plot of the angle of incidence versus dye laser output power for a KHz dye laser system with a simple grazing incidence cavity.

The output power versus angle of incidence for this laser is plotted in FIG. 11. The maximum absorbed pump power at 532 mm was 180 mW at 1 KHz. For an angle of incidence of 78°, a conversion efficiency of 20% with 20 mW output was observed. However, as the angle is increased to 88.5°, the output power dropped rapidly to 2-3 mW, representing an efficiency of 2%.

In an attempt to improve the efficiency of the laser while retaining the spectral linewidth, an internally self-injected grazing-incidence cavity was designed. In this setup, two cavities were formed; (a) a nondispersive main cavity, and (b) a narrow line auxiliary cavity. This was accomplished by simply adding an output coupler at the location of the zeroeth order beam from the grating as shown in FIG. 6. In this configuration, the auxiliary cavity continuously injects a narrow line to control the stimulated process in the main cavity. As the round trip time in a 5 cm cavity is 300 psec, there can be at least 60 round trips during the time (approximately 20 nsec) that the population of the dye medium is inverted. In this way even a small feedback from the auxiliary cavity is sufficient to control the stimulated emission from the main cavity.

In the self-injected grazing-incidence configuration, the output was improved by a factor of ten to a conversion efficiency of 20%. However, spectral linewidth was observed to be slightly broadened. This broadening is attributed to the mismatch in the main cavity length (L) to the resonant wavelength (λ) of the injected signal due to poor mechanical mounts used in the present experiment.

EXAMPLE 2

In this example is described an all solid state KHz repetition rate Ti:Sapphire laser capable of delivering average power exceeding 250 mW with a pulse duration of 12 nsec and peak power in excess of 25 KW. This laser is tunable in a wide spectral region from approximately 670 nm–1070 nm.

Figure 12:
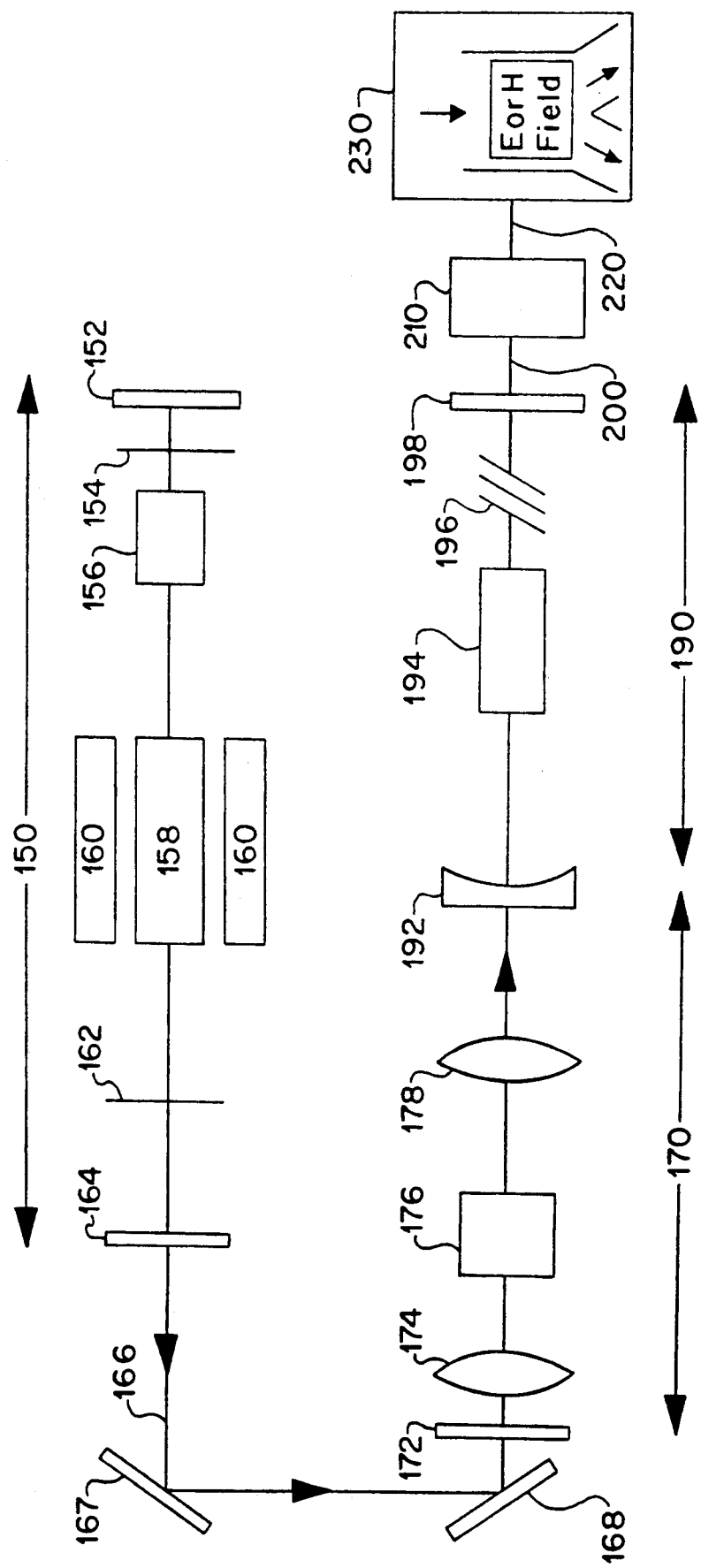
FIG. 12 illustrates a preferred embodiment of the Nd:YLF/Ti:sapphire laser of the present invention.

As shown in FIG. 12, a preferred embodiment of this laser as utilized for laser isotope separation comprises a pump laser 150, a first frequency-doubler 170, an output laser 190, a second frequency-doubler 210, and a fluid containment and separation system 230.

Pump laser 150 comprises a high reflective mirror 152, a first lens 154, an acousto-optical Q-switch 156, a Neodymium:Yttrium Lanthanum Fluoride (Nd:YLF) crystal 158, an optical pump 160, a second lens 162 and an output coupler 164. Mirror 152 and output coupler 164 are both convex spherical reflective surfaces spaced apart approximately 139.5 cm and having radii of curvature of 120 cm. Mirror 152 is highly reflective (>99%) while coupler 164 allows about 9%–12% transmission at wavelengths of interest. Lens 154 is a cylindrical lens located about 37.5 cm from mirror 152 and has a focal length of 1.3 m. Q-switch 156 is a conventional Q-switch and is located about 46.2 cm from mirror 152. YLF crystal is a cylindrical rod, 4 mm in diameter and 80 mm long, located 65 cm from mirror 152. Optical pump 158 illustratively is an arc lamp and preferably is an array of light emitting diodes. Lens 162 is a spherical lens having a focal length of 35 cm that is located approximately 80.6 cm from mirror 152. These elements are selected and positioned within the cavity so that the YLF rod is completely filled with the standing wave in the cavity and the laser is operated so as to achieve long pulse durations. When the Nd:YLF crystal is optically pumped by optical pump 160, a CW laser beam 166 is produced which is Q-switched by Q-switch 156. This arrangement can be made to extract multimode energy in a single mode in laser pulses having a pulse energy of 1.5 to 2 milliJoules and a pulse width of 200–300 nanoseconds at a pulse repetition rate at 1 to 3 kilohertz. The output wavelength of this pump laser is on the order of 1054 nanometers.

Laser beam 166 is reflected by mirrors (or prisms) 167, 168 to frequency-doubler 170. Frequency-doubler 170 comprises a half-wave plate 172, an expanding lens 174, a frequency-doubling crystal 176 such as KTP, and a focusing lens 178.

The frequency-doubled beam 180 from doubler 170 is then applied to laser 190. Laser 190 comprises a high reflectance mirror 192 which is partially transmissive to the beam incident on it from doubler 170, a titanium:-sapphire crystal 194, a bi-refringement tuner 196 and a mirror 198 which is partially transmissive at the output frequencies of the laser. The frequency-doubled beam from the pump laser pumps the titanium:sapphire crystal in a longitudinal pumping configuration. As a result, output laser 190 is capable of generating a laser beam 200 having an average power exceeding 250 milliWatts with a pulse duration of 12 nanoseconds and a peak power in excess of 25 KiloWatts. The wave-length of laser beam 200 from laser 190 may be tuned by birefringement turner 196 from approximately 670 to 1070 nanometers. Alternatively, anyone of the output coupler and tuning arrangements shown in FIGS. 5, 6 and 7 (specifically, tuning mirror 58 and holographic grating 60; tuning mirror 84, grating 80 and output coupler 78; and tuning mirror 104, grating 100 and output coupler 98) may be used.

Laser beam 200 is then applied to frequency-doubler 210 which illustratively is of the same construction as frequency-doubler 170. The frequency-doubled laser beam 220 from frequency-doubler 210 is then directed into containment and separation system 230. Containment and separation system 230 per se is of conventional construction. It comprises means for containing a fluid comprised of two or more substances, one of which is to be ionized by interaction with the frequency-doubled laser beam 220. Illustratively, the fluid is a gaseous stream of Uranium-235 and 238 isotopes and the Uranium-235 isotopes are ionized by the laser radiation. Isotope separation is accomplished in the normal fashion by applying a magnetic or electric field to the stream after ionization. As will be apparent to those skilled in the art, the field causes the ionized particles to move in a different direction from the non-ionized particles, thereby permitting them to be separated.

Figure 14:
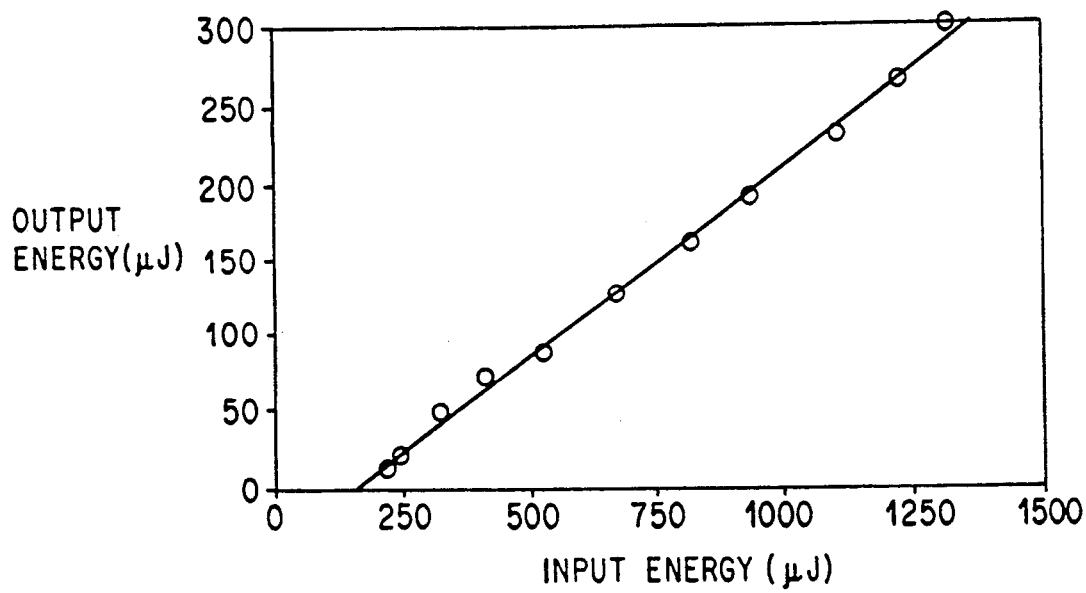
FIG. 14 is a plot of the observed input versus output energy for a Ti:sapphire laser operating at a KHz repetition rate.

Different crystal lengths and doping levels of $Ti^{3+}$ ions and variable pump pulse width were used to characterize the Ti:Sapphire laser performance. The output versus input energy (not absorbed energy) for T=20% is shown in FIG. 14. Here, the pump laser was operating at 1 KHz with pump pulse width of 0.2 μsec. A system efficiency of 23% with threshold pump energy of 200 μJ was obtained.

The temporal output of the Ti laser was observed to be considerably shorter than the pump pulse width, a characteristic of gain switched operation. The laser pulse width ranged from 30 nsec to 12 nsec, the pulse width decreasing with increasing pump energy. As expected, the delay between the pump and laser pulses was observed to be decreasing with the incident pump energy.

A systematic study of pump pulse width versus Ti:-Sapphire laser output has revealed that the photon conversion efficiency as well as the threshold pump energy increase with the pump pulse width.

Figure 15:
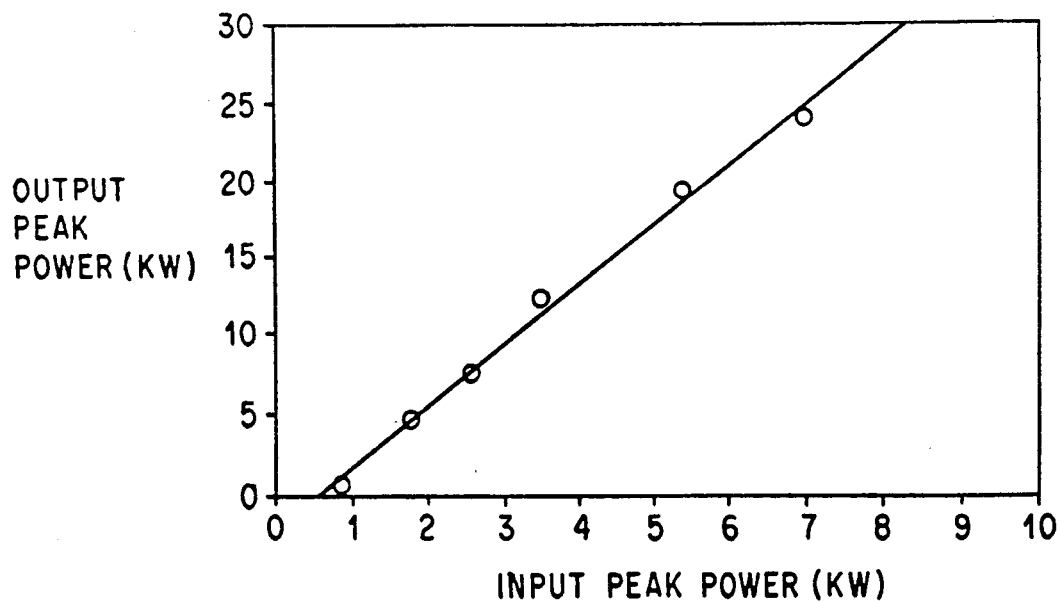
FIG. 15 is a plot of input versus output peak power for a Ti:sapphire laser operating in the 1–3 KHz range.

Input peak power versus output peak power is plotted in FIG. 15. These data were obtained by varying the repetition rate and hence the pulse width (peak power) of the pump laser. The output peak power was observed to increase linearly with the input peak power. Due to the gain switched operation, a peak power conversion efficiency of 350% was obtained with output peak power exceeding 25 KW.

Figure 16:
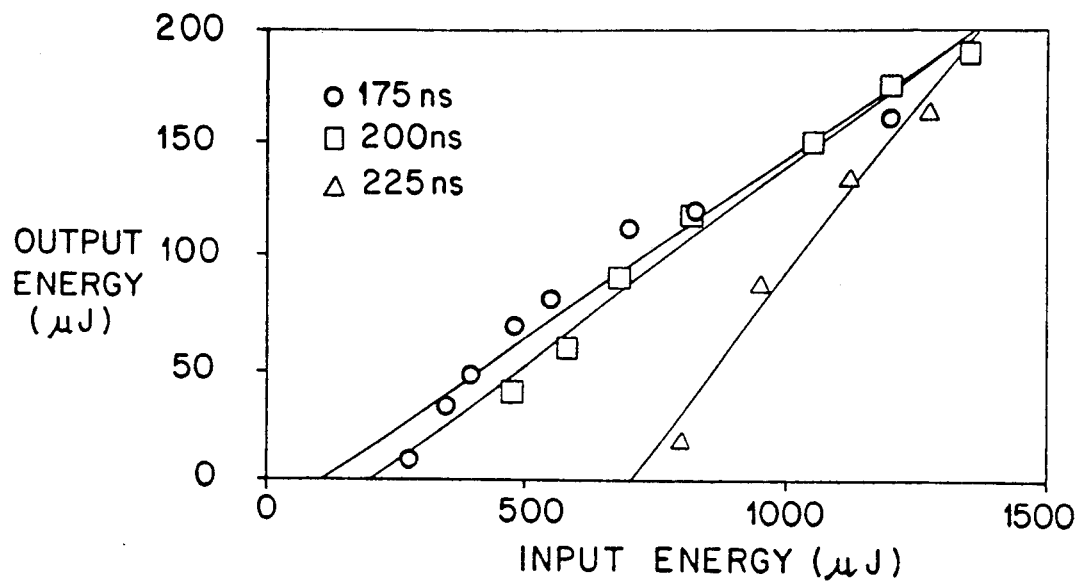
FIG. 16 is a plot of input versus output energy for a Ti:sapphire laser operating in the kiloHertz range at different pulse repetition rates.
Figure 17:
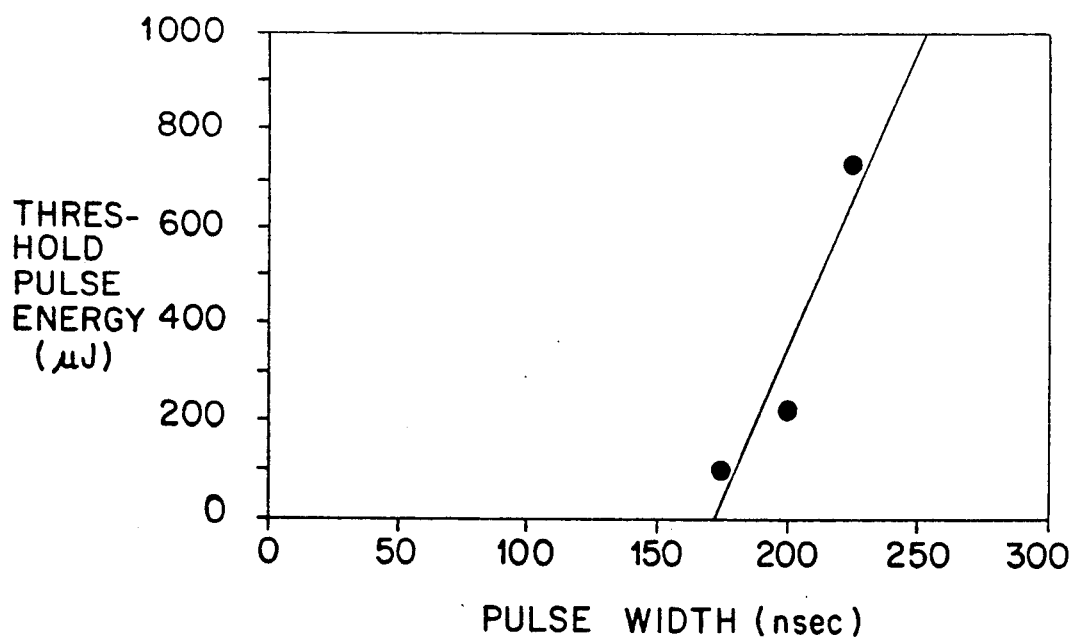
FIG. 17 is a plot of threshold pulse energy versus pulse width for a Ti:sapphire laser operating in the kiloHertz range.
Figure 18:
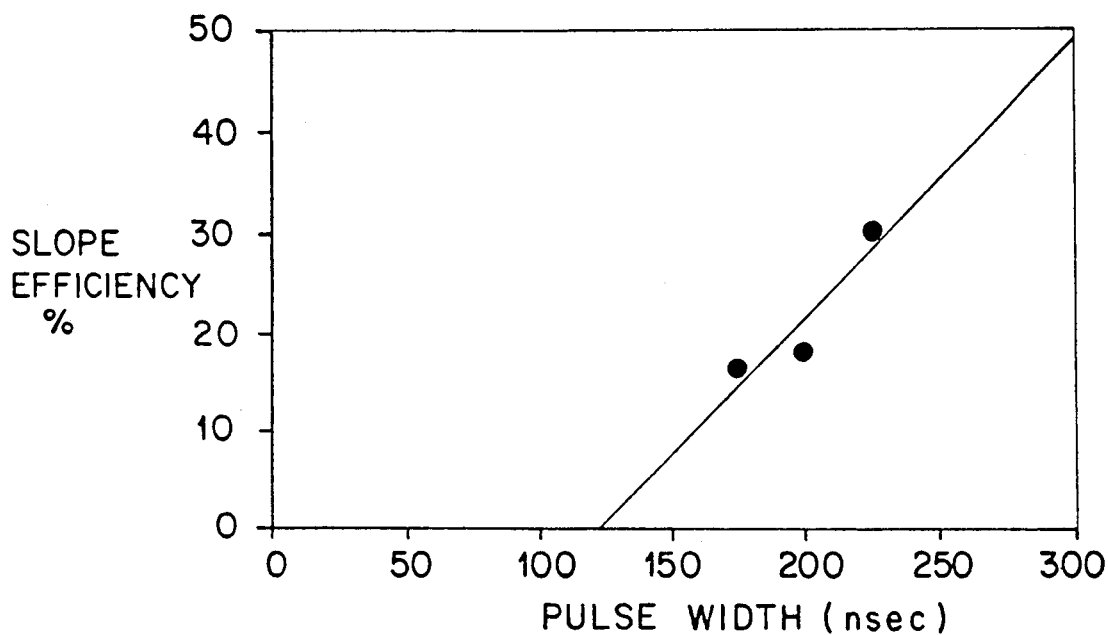
FIG. 18 is a plot of slope efficiency versus pulse width for a Ti:sapphire laser operating in the kiloHertz range.
Figure 20:
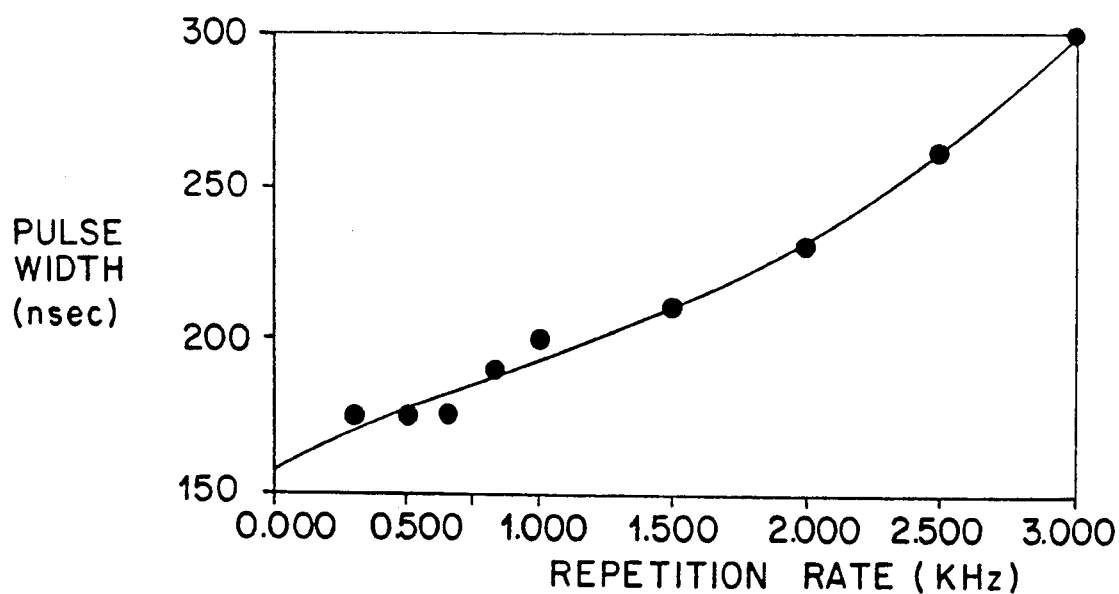
FIG. 20 is a plot of repetition rate versus pulse width for a CW Q-switched frequency-doubled Nd:YLF laser.
Figure 19:
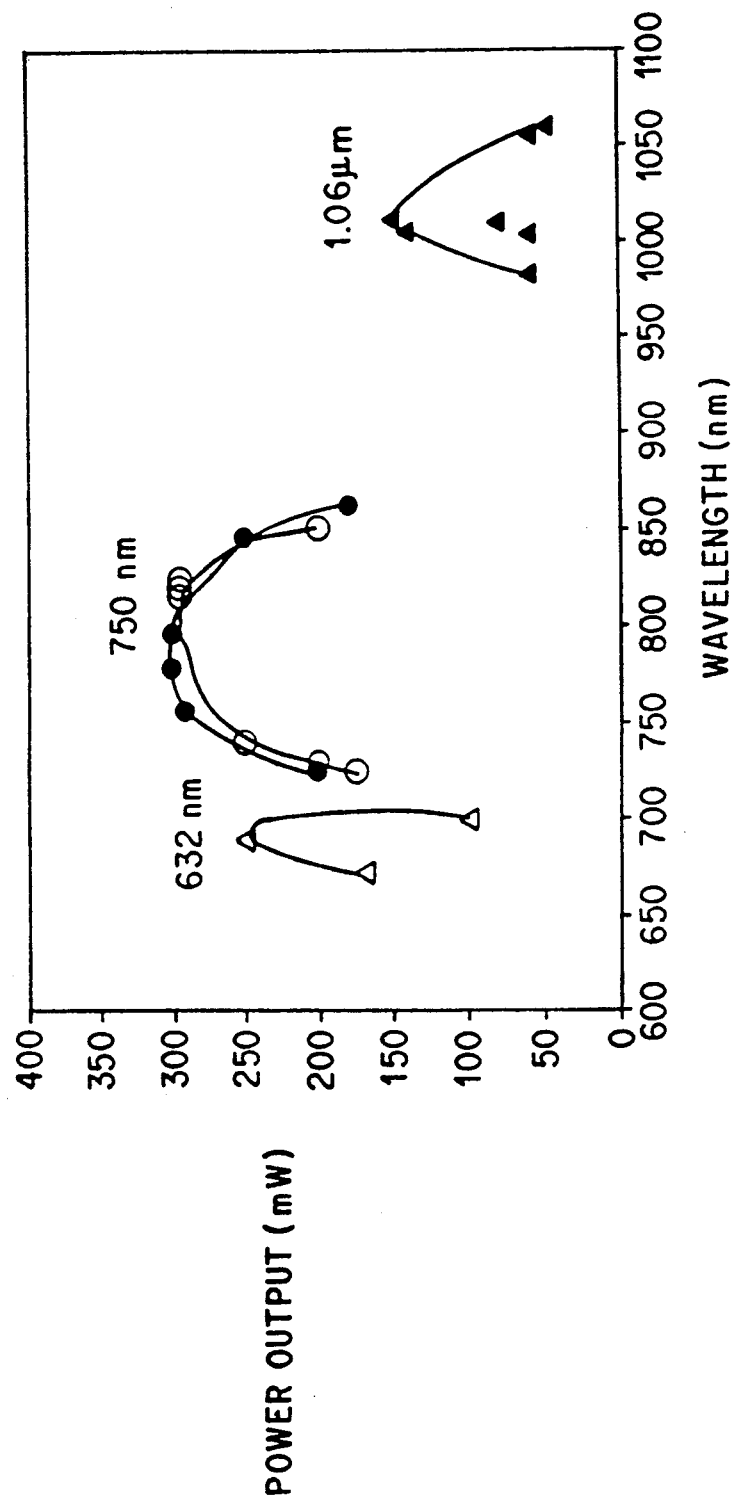
FIG. 19 is a plot of power output of a kilohertz Ti:sapphire laser over different tuning ranges using different sets of available optics.

Input and output energy plots for pump pulse durations of 175 ns, 200 ns, and 225 ns are shown in FIG. 16, Photon conversion efficiency and threshold pump energy for variable pump pulse duration are shown in FIGS. 17 and 18, respectively. Observed tuning curves of the laser with different sets of optics centered around 632 nm, 750 nm, and 1.06μ are shown in FIG. 19. Due to the long pulse width of the present pump laser, the output in the extended region of the gain distribution, on both the short and long wavelength side, did not drop off significantly. The output at 675 nm, 800 nm, and 1.0μ were observed to be 200 mW, 300 mW, and 150 mW, respectively, for an input power of 1.3 Watt at a 1 KHz repetition rate. FIG. 20 shows the pulse-width versus repetition rate of the CW, Q-switched frequency-doubled Nd:YLF laser. The cavity length and CW operation of Nd:YLF are modulated such that 200–300 nsec pulse duration from 1–3 Khz repetition rate was obtained. For an optimum configuration of Nd:YLF-/Ti:Sapphire, we have observed output power exceeding 400 mW and threshold pump power of 200 mW, for an input power of 1.7 W at 527 nm and at 1 Khz. This is in contrast to results of output power of 300 mW and threshold pump power of 3 W with an input power of 11.6 W in the Copper vapor (20 nsec pump pulse width) laser pumped KHz Ti:Sapphire laser. This is the highest conversion efficiency ever observed in Ti:Sapphire laser. This highly efficient (23%) and low threshold performance of Nd:YLF/Ti:Sapphire combination is specifically due to the long pulse width of the Nd:YLF-/Ri:Sapphire combination as well as careful mode-matching of the pump beam to the cavity modes.

One additional advantage of long pump pulse width (200–300 nsec) scheme is that regardless of the pump laser duration, the temporal output of Ti:Sapphire will always be considerably shorter (10–20 nsec) due to the gain switched operation. The gain switched operation of the Ti:Sapphire laser yielded an output pulse duration of 10–12 nsec with peak power exceeding 30 KW. This high peak power has allowed us to frequency-double the fundamental radiation efficiently to generate a tunable radiation almost in the entire spectrum from UV to IR (335–1070 nm) at KHz repetition rate.

Figure 13:
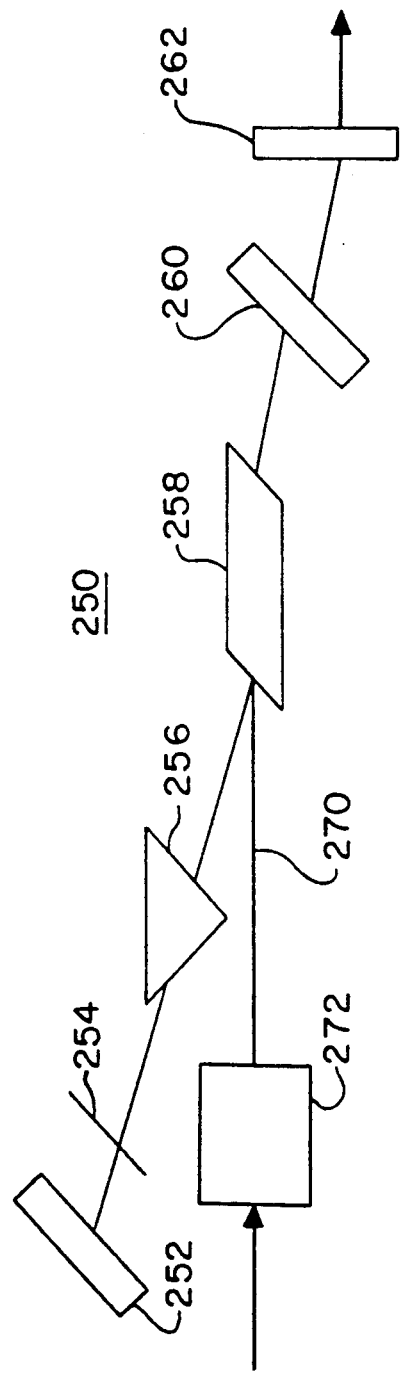
FIG. 13 illustrates an alternative to the embodiment of FIG. 12.

Numerous modifications in the above-described systems will be apparent to those skilled in the art. While the Nd:YLF/Ti:sapphire laser system is preferred, other pumping arrangements may be used and other lasers may be used in place of Ti:sapphire. For example, a cobalt-doped magnesium fluoride crystal may be used in place of a Ti:sapphire laser. While the longitudinal pumping arrangement shown in FIG. 12 has the advantage of simplicity, transmission through mirror 192 imposes large losses on the system. An alternative is to introduce a prism into the cavity as shown in the system of FIG. 13 to separate the optical axis of the Ti:sapphire crystal from the pump axis. Thus, in an alternative laser system the output laser cavity 250 illustratively comprises a high reflectance mirror 252, an etalon 254, a prism 256, a Ti:sapphire crystal 258, a birefringement tuner 260, and a partially transmissive mirror 262. In this arrangement the prism provides a broad (or coarse) tuning capability while the birefringement tuner provides a fine tuning capability. A pump beam 270 from a pump laser (not shown) is introduced into the cavity by pump focusing optics 272 so as to pump the Ti:sapphire crystal longitudinally.

As will be apparent to those skilled in the art, numerous other variations may be made in the practice of the invention.

What is claimed is:

1. A laser system comprising:
  a resonating cavity comprising first and second mirrors,
  an active medium within the resonating cavity,
  a pump laser aligned with said active medium so as to pump said active medium longitudinally with a pump beam to generate stimulated emission,
  wherein:
   the pulse width of the pump beam is greater than the round trip time within the resonating cavity so as to support multiple round trips of the stimulated emission,
   said active medium is a titanium:sapphire crystal or a cobalt-doped magnesium fluoride crystal and the pump laser is a neodymium:yttrium lanthanum fluoride laser.

2. The laser system of claim 1 wherein the pump laser is operated at a pulse repetition rate of at least approximately one kilohertz and above.

3. The laser system of claim 1 further comprising means for Q-switching the pump laser.

4. The laser system of claim 1 further comprising an optical pump source for the pump laser.

5. The laser system of claim 4 wherein the optical pump source is an array of light emitting diodes.

6. The laser system of claim 1 further comprising a prism for separating the optical axis of the cavity from an axis along which said pump laser pumps the active medium.

7. The laser system of claim 1 further comprising means for tuning the wavelength of a laser beam emitted from said resonating cavity.

8. The laser system of claim 7 wherein the tuning means comprises a birefringement element.

9. The laser system of claim 7 wherein the tuning means comprises a prism and a birefringement element.

10. The laser system of claim 9 wherein the prism is positioned so as to separate the optical axis of the cavity from an axis along which said pump laser pumps the active medium.

11. A laser system comprising:
  a resonating cavity comprising a first fixed mirror, a diffraction grating and a second rotatable mirror;
  an active medium within the cavity; and
  a pump laser aligned with said resonating cavity so as to pump said active medium longitudinal with a pump beam to generate stimulated emission, wherein:
   (a) the pulse width of the pump beam is greater than the round trip time within the resonating cavity so as to support multiple round trips of the stimulated emission;
   (b) the pump beam is passed through the fixed mirror and directed at the active medium;
   (c) the grating is mounted on an optic axis defined by the fixed mirror and the active medium near a grazing angle;
   (d) the fixed and rotatable mirrors reflect emissions from the active medium;
   (e) the rotatable mirror is placed in the first order diffraction position from the grating; and
   (f) the active medium is titanium:sapphire or cobalt-doped magnesium fluoride.

12. The laser system of claim 11 wherein the pump laser is a Neodymium: Yttrium Lanthanum Fluoride (Nd:YLF) laser.

13. The laser system of claim 12 wherein the pump laser is operated at a pulse repetition rate of at least approximately one kilohertz.

14. The laser system of claim 11 further comprising means for Q-switching the pump laser.

15. The laser system of claim 11 further comprising an optical pump source for the pump laser.

16. The laser system of claim 15 wherein the optical pump source is an array of light emitting diodes.

17. The laser system of claim 11 wherein said pump beam and said optic axis form an angle which is between about zero and about five degrees.

18. The laser system of claim 11 wherein said angle is between 87 and 89.5 degrees as measured with respect to a normal to the grating.

19. The laser system of claim 11 wherein:

a) the pump beam and said optic axis form an angle which is between about zero and about five degrees;
b) said grazing angle is between 87 and 89.5 degrees; and
c) the length of said resonating cavity is less than about 8 cm.

20. The laser system of claim 11 further comprising an output coupler placed in the zeroeth order diffraction position from the grating to form a main oscillator cavity comprising the output coupler, the diffraction grating, and the first fixed mirror.

21. The laser system of claim 11 further comprising an output coupler placed along the optic axis between the active medium and the diffraction grating to form a main oscillation cavity comprising the output coupler and the first fixed mirror.

22. A laser system comprising:
a resonating cavity comprising a first fixed mirror, a diffraction grating, a second rotatable mirror and an output coupler;
an active medium within the cavity; and
a pump laser aligned with said resonating cavity so as to pump said active medium longitudinally with a pump beam to generate stimulated emission, wherein:
(a) the pulse width of the pump beam is greater than the round trip time within the resonating cavity so as to support multiple round trips of the stimulated emission;
(b) the pump beam is passed through the fixed mirror and directed at the active medium;
(c) the grating is mounted on an optic axis defined by the fixed mirror and the active medium near a grazing angle;
(d) the fixed and rotatable mirrors reflect emissions from the active medium;
(e) the rotatable mirror is placed in the first order diffraction position from the grating to form a narrow-line auxiliary cavity;
(f) the output coupler is placed in the zeroeth order diffraction position from the grating to form a main oscillator cavity comprising the output coupler, the diffraction grating, and the first fixed mirror; and
(g) the active medium is titanium:sapphire or cobalt-doped magnesium fluoride.

23. The laser system of claim 22 wherein the pump laser is a Neodymium: Yttrium Lanthanum Fluoride (Nd:YLF) laser.

24. A laser system comprising:
a resonating cavity comprising a first fixed mirror, a diffraction grating, a second rotatable mirror and an output coupler;
an active medium within the cavity; and
a pump laser aligned with said resonating cavity so as to pump said active medium longitudinally with a pump beam to generate stimulated emission, wherein:
(a) the pulse width of the pump beam is greater than the round trip time within the resonating cavity so as to support multiple round trips of the stimulated emission;
(b) the pump beam is passed through the fixed mirror and directed at the active medium;
(c) the grating is mounted on an optic axis defined by the fixed mirror and the active medium near a grazing angle;
(d) the fixed and rotatable mirrors reflect emissions from the active medium;
(e) the rotatable mirror is placed in the first order diffraction position from the grating to form a narrow-line auxiliary cavity;
(f) the output coupler is placed along the optic axis between the active medium and the diffraction grating to form a main oscillation cavity comprising the output coupler and the first fixed mirror; and
(g) the active medium is titanium:sapphire or cobalt-doped magnesium fluoride.

25. The laser system of claim 24 wherein the pump laser is a Neodymium: Yttrium Lanthanum Fluoride (ND:YLF) laser.

26. A laser isotope separation system comprising:
a first laser having a tunable output wavelength in the range of approximately 600 to approximately 1100 nanometers, the active medium of the first laser being titanium:sapphire;
a pump laser aligned to pump said first laser longitudinally with a pump beam at repetition rate of at least approximately one kilohertz to generate stimulated emission, the pulse width of the pump beam being greater than the round trip time within the resonating cavity of the first laser so as to support multiple round trips of the stimulated emission;
means for frequency doubling a laser beam produced by said first laser to produce a frequency-doubled laser beam;
means for interacting said frequency-doubled laser beam with a fluid containing at least two substances one of which is ionized by said laser beam; and
means for separating the ionized substance from the remainder of the fluid.

27. The system of claim 26 wherein the separating means comprises a magnetic or electric field.

28. The system of claim 26 wherein the pump laser is a Neodymium: Yttrium Lanthanum Fluoride laser.

29. The system of claim 28 wherein the pump laser is Q-switched such that the pump beam is a pulsed laser beam at a frequency of at least one kilohertz.

30. The system of claim 28 wherein the pump laser is optically pumped by an array of light emitting diodes.

31. The system of claim 26 wherein the fluid is a gaseous stream containing Uranium-235 and Uranium-238 isotopes.

32. A laser isotope separation system comprising:
a first laser which is a titanium:sapphire laser;
a neodymium:yttrium lanthanum fluoride laser aligned to pump said first laser longitudinally with a pump beam to generate stimulated emission, the pulse width of the pump beam being greater than the round trip time within the resonating cavity of the first laser so as to support multiple round trips of the stimulated emission;
means for frequency-doubling a laser beam produced by said first laser to produce a frequency-doubled laser beam;
means for interacting said frequency-doubled laser beam with a gaseous stream of Uranium-235 and Uranium-238 isotopes to ionize Uranium-235 isotopes; and
means for separating the ionized Uranium-235 isotopes from the stream.

33. The system of claim 32 wherein the separating means comprises a magnetic or electric field.

34. The system of claim 32 wherein the pump laser is Q-switched such that the pump beam is a pulsed laser beam at a frequency of at least one kilohertz.

35. The system of claim 32 wherein the pump laser is optically pumped by an array of light emitting diodes.

36. A method of separating isotopes comprising the steps of:

generating a pumping laser beam having a pulse repetition rate of at least approximately one kilohertz;

using said pumping laser beam to pump a second laser to produce an output laser beam, the active medium of the second laser being titanium:sapphire or cobalt-doped magnesium fluoride, and the pulse width of the pump laser beam being greater than the round trip time within the resonating cavity of the second laser so as to support multiple round trips of the stimulated emission from the active medium;

doubling the frequency of the output laser beam to produce a frequency-doubled beam;

interacting the frequency-doubled beam with a fluid containing at least two substances, one of which is ionized by photons in said laser beam which have an energy in excess of an ionization potential of said substance; and separating the ionized substance from the remainder of the fluid.

37. The method of claim 36 wherein the fluid is a gaseous stream containing Uranium-235 and Uranium-238 isotopes.

* * * * *